C. L. RIKER.
Improvement in Steam Vacuum Pumps.
No. 125,410.
Patented April 9, 1872.
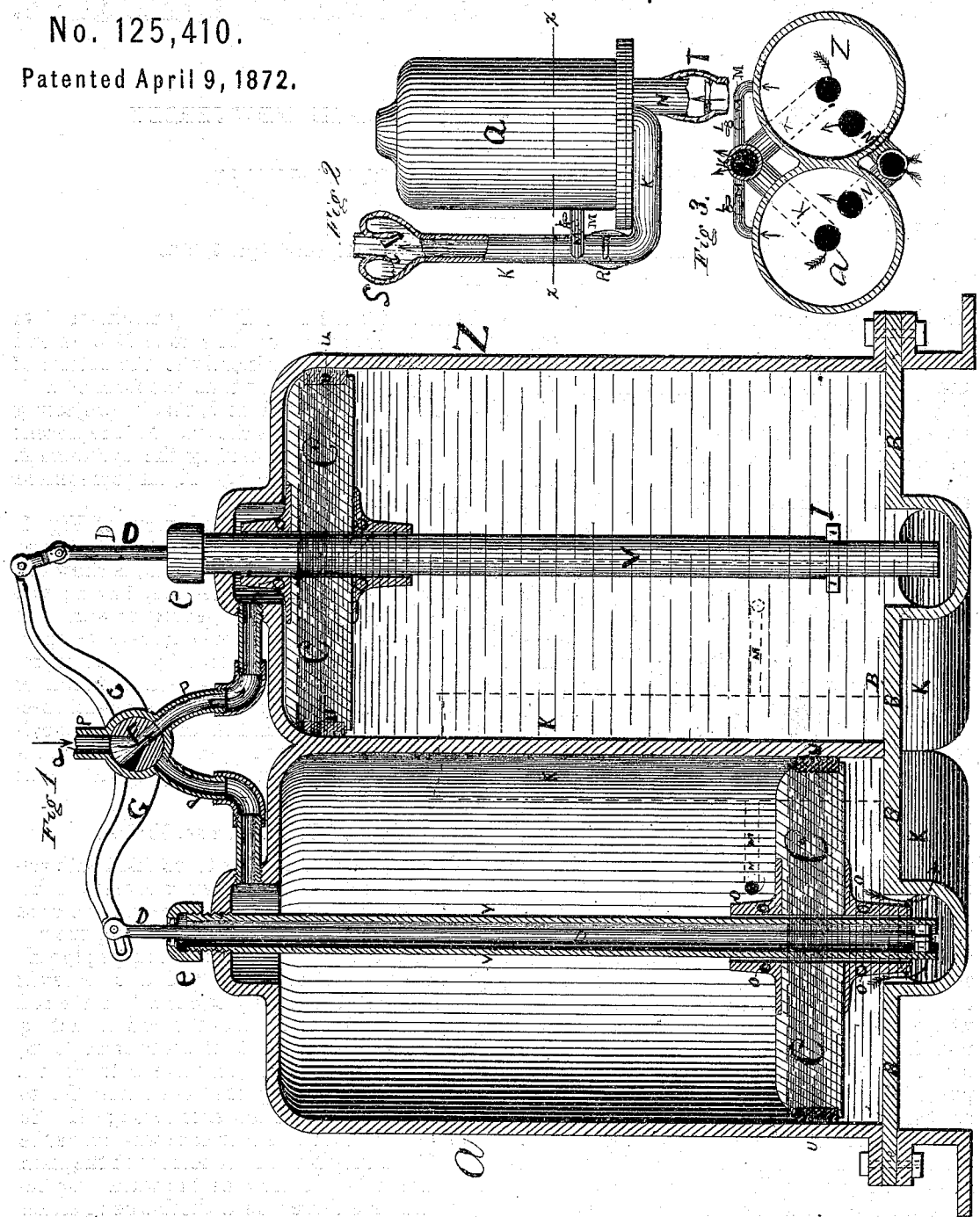
Witnesses.
Harry King.
W. A. Bower.
Inventor.
Carroll L. Riker.

125,410

UNITED STATES PATENT OFFICE.

CARROLL L. RIKER, OF SCHRAALENBURGH, NEW JERSEY.

IMPROVEMENT IN STEAM VACUUM-PUMPS.

Specification forming part of Letters Patent No. 125,410, dated April 9, 1872.

*To all whom it may concern:*

Be it known that I, CARROLL L. RIKER, of Schraalenburgh, in the county of Bergen and State of New Jersey, have invented a new and Improved Steam Vacuum-Pump; and I do hereby declare that the following is a full, clear, and exact description thereof, which will enable others skilled in the art to make and use the same, reference being had to the accompanying drawing forming part of this specification.

Figure 1 is a vertical sectional view of my improved steam vacuum-pump; Fig. 2, an end view; Fig. 3, a horizontal sectional view of same.

My invention has for its object to furnish a steam-pump which shall be cheaper and more economical than any heretofore known. It consists in the combination and the construction of the various parts of the apparatus, as hereinafter more fully described.

Fig. 1—A and Z are close cylindrical vessels, of sufficient strength and suitable material, cast in one or separately, being closed at the top and open at the bottom. These are bolted or otherwise fastened to the base B B B prepared for the same, and having ways $m\ m$ cast in it, leading from the center of each cylinder, and terminating in the discharge K, represented by dotted lines, and shown in Fig. 2. $c\ c\ c\ c$ represent two floats, commonly made of wood, but can be of any suitable material, surrounded by a loose fibrous packing, U U U U, made of felt, flannel, or other material, for the purpose of reducing the condensation as much as possible by preventing the steam from coming in direct contact with the cold water around the edges of the floats. These floats are loose-fitting, rising and falling on the surface of the water in said cylinders. O O O O are guides, made of metal, and either bolted or screwed to $c\ c$, for the purpose of guiding said floats in their ascent and descent by the pipes $v\ v$, which are screwed into the tops of their respective cylinders, and which are allowed to project through sufficiently to take the stuffing-boxes $e$, through which the rods D D pass steam-tight. F is a three-way plug-cock, supported in its position by the pipes P P, leading from F to the cylinders A and Z. To said cock is fastened the cross-beam G G, which is connected with the rods D D by means of slots and connecting-rods. The rods D D extend through the interior nearly to the bottom of said pipes, where they take the form of a T, which is represented at I, this T projecting through a slot in V, as shown. M M represent two small pipes, connecting the cylinders A and Z with the discharge K, all represented by dotted lines.

Fig. 2 represents an end view of Fig. 1. Same letters denote same parts. A better view of M M, with their cocks L, is shown in Fig. 2; also the discharge-pipe, having two check-valves, R and S, opening upward. N is the suction-pipe, with its check-valve opening upward, not shown in Fig. 1, but represented in Fig. 3, which is a section on line of X X of Fig. 2, and represents a horizontal sectional view of same, and A and Z the two cylinders, K K discharge-pipes, N N suction-pipes, and M M air-exhaust pipes, with cocks L L.

General Description of Working.

Suppose both cylinders to be filled with water, the floats will be to their greatest height. Steam is turned on, passes through the cock F and pipe P, into cylinder Z, forcing the water it contains through the discharge-pipe K. As the water lowers in Z, the float $c$ descends until it strikes the projections 1 1 of the rod D, bringing it down, and the rod D, acting upon the cross-beam G, causes it to come down, which, in turn, causes the valve F to make a partial turn, changing the steam from Z into A, in turn forcing its contents through K. So long as the water in either case was above the pipes M M they acted in concert with the main discharge; but as soon as the water was below said pipe there was a discharge of steam through them, and with said steam a quantity of the air which naturally accumulates in such cases by the condensed steam and from other causes. As the pipe M enters the discharge K above the check-valve R there is always a pressure in said pipe equal to the height of the discharge. When the pressure in Z is less than the height of the discharge column in K there will be a flow of water from the discharge-pipe back into Z, which would act as a jet in a condenser, condensing the steam instantly, and causing a vacuum in Z, when the valve in the suction would open and the water rush in, filling it. It requires less time for a cylinder to fill than it does for it to discharge; consequently, when the steam is turned into one cylinder by the other becoming empty, it is always ready for action, and we have a continuous and steady delivery.

The improvements herein described are applicable to a pump with one cylinder as well as with two, and at S, Fig. 2, I have represented a valve and an air-chamber combined for a single-acting steam-pump. The advantage is this, that in a single-acting steam-pump it is necessary to complete the vacuum as quick as possible in order to get a steadier stream. This air-chamber is to overcome this difficulty as much as possible. The moment the pressure of steam in the pump is less than the pressure of the air in said chamber, a large jet of water is injected, but only for a moment, or as long as the air in said chamber permits. If the valve and chamber were not there, the water would continue to flow from the discharge during the continuance of said vacuum, which is the case in the double-acting pump; but in that case the pipes M M were so small and the backward flow so diminutive that there is no power lost.

Having thus described my invention, what I claim as new, and desire to claim by Letters Patent, is—

1. The combination of the pipes M M and cocks L L with pipe K and cylinders A and Z, all arranged substantially as and for the purpose specified.

2. The combination of the cylinders A and Z and the floats c c and attachments, guide-pipes V V, knobs I I, rods D D, connected with beam G, and cock F, substantially as and for the purpose specified.

3. The combination of the valve and air-chamber at S, substantially as shown, and for the purpose specified.

In testimony whereof I have signed my name to this specification in the presence of two subscribing witnesses.

CARROLL L. RIKER.

Witnesses:
   T. C. CONNOLLY,
   F. A. LEHMAN.